Sheet 1
2 Sheets.

H. W. Peaslee.

Pulp Washer.

No. 340. Reissued Jan. 8, 1856.

Witnesses

W. Millwain
Alfred Mudd

Inventor

Horace W. Peaslee

H. W. Peaslee.

Sheet 2
2 Sheets.

Pulp Washer:

No. 340. Reissued Jan. 8, 1856.

Witnesses
W. Marbelman
Alfred Auch

Inventor
Horace W. Peaslee

UNITED STATES PATENT OFFICE.

HORACE W. PEASLEE, OF MALDEN RIDGE, NEW YORK.

IMPROVEMENT IN MACHINES FOR WASHING PAPER-STOCK.

Specification forming part of Letters Patent No. 12,283, dated January 23, 1855; Reissue No. 340, dated January 8, 1856.

*To all whom it may concern:*

Be it known that I, HORACE W. PEASLEE, of Malden Ridge, in the county of Columbia and State of New York, have invented certain new and useful Improvements in Machinery for Washing Paper-Stock; and I do hereby declare that the following is a full, clear, and exact description of the same, reference being had to the accompanying drawings, forming part of this specification, in which—

Figure 3:
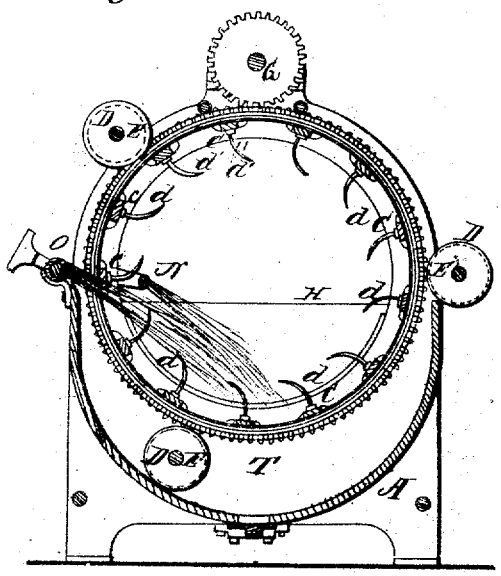
Figure 1:
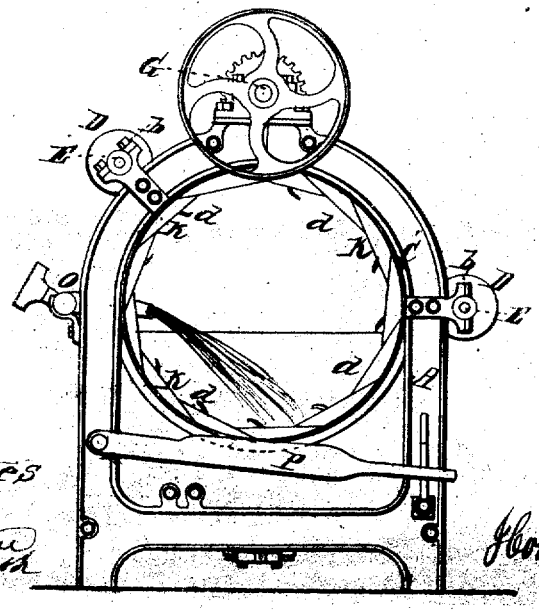
Figure 2:
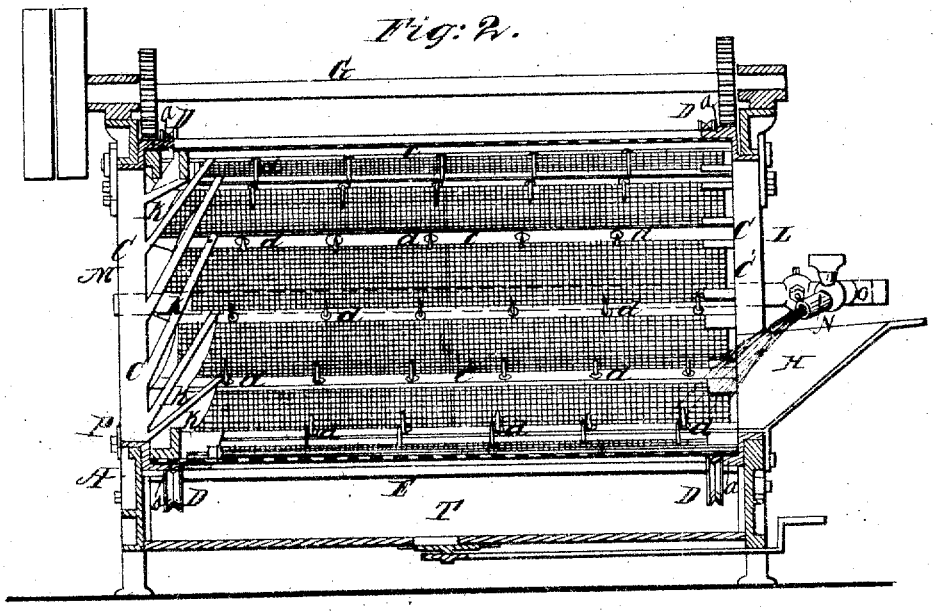
Figure 4:
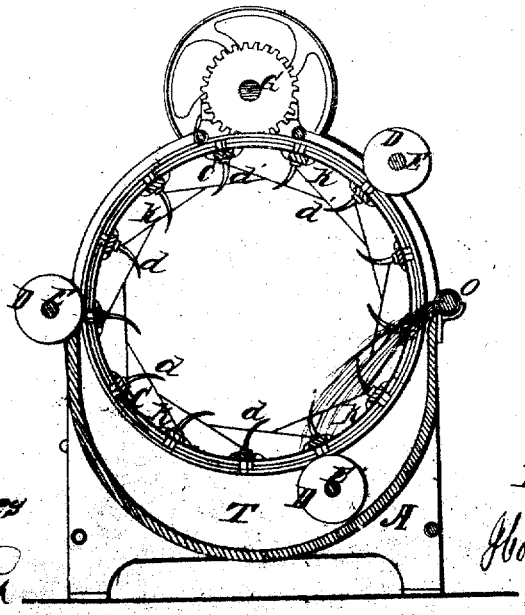

Figure 1 is a view of that end of the machine where the discharge of the washed stock takes place. Fig. 2 is a longitudinal vertical section through the center. Fig. 3 is a transverse vertical section looking toward the entrance to the cylinder. Fig. 4 is a transverse section looking toward the discharge end of the cylinder.

Similar letters of reference indicate corresponding parts in the several figures.

The nature of my invention for washing paper-stock consists in the employment of a wire-gauze or reticulated rotating cylinder, with open ends, placed with its axis in a horizontal or slightly-inclined position, and provided inside with pointed teeth or hooks projecting inward, for the purpose of separately catching and carrying up the paper-stock and letting it fall from the top when the said cylinder is placed, so that its lower part will revolve in a trough supplied with water for the purpose of cleansing the paper-stock and carrying off the dirt separately therefrom; and my said invention also consists in combining with the cylinder, constructed and provided with teeth or hooks, as above specified, and revolving in a trough of water, as above set forth, the employment of a succession of inclined curbs or flanges arranged around the inner periphery of the said cylinder, and at the discharge end thereof, to form a succession of inclined channels for the purpose of regulating the discharge of the paper-stock from the said cylinder.

To enable others skilled in the art to make and use my invention, I will proceed to describe its construction and operation.

A A is the framing of the machine, with a trough, T, in which rotates the washing-cylinder, a small portion of the lower part only of which is intended to be immersed in water. The cylinder is made of woven-wire work attached to two strong metal rings, C C—one at each end—which are furnished outside with ways *a a*, fitted to grooves in rollers D D on shafts E E, where journals are fitted to boxes *b b* on the standards A A. The rollers D D form bearings in which the cylinder rotates. A portion, *c'*, of each ring C passes through a circular opening in one of the standards A A, in which it fits so as not to produce too much friction, the object being to bring the open ends of the cylinder flush with or beyond the outer faces of the standards, and to close up the ends of the trough, which consist, in part, of the standard, so that very little, if any, water will escape around the cylinder, and to prevent the paper-stock from entering between the end of the cylinder and the trough. Each ring C is furnished with spur-teeth all around to gear with one of two spur-wheels on the driving-shaft G, sustained in boxes on the standards above the cylinder, and receiving rotary motion from any suitable motor for the purpose of revolving the cylinder. The cylinder is strengthend by longitudinal wooden strips *c c*, which are close to the inner surface of the wire-work, and which serve to hold the hooks or bent teeth *d d*. These teeth are made of steel with sharp points, and curved in the direction of the rotation, to catch and carry up the rags or other stock as the cylinder rotates, and to drop it as they severally rise to their highest position, as shown at *d' d'* in Figs. 3 and 4. They may be arranged in a spiral line, winding several times round the cylinder, as shown in Fig. 2, the direction of the spiral being such as will cause the stock to be carried from the end L of the cylinder, where it is fed in, to the other end, M, where it is discharged. At the end L of the cylinder where the stock is to be fed in, there is a chute, H, secured to the standard A and extending a short distance into the cylinder, as shown in Fig. 2. At the opposite or discharge end of the cylinder are arranged any desired number of oblique curb-pieces, K K, placed at equal distances apart, firmly bolted to the cylinder, extending from the inner edge of the part *c'* of the ring C a short distance into the cylinder, and of such depth as to form a barrier to regulate the delivery of the paper-stock from the cylinder. The spaces between the curb-pieces form channels, and the obliquity of these channels is such that when the washed stock arrives at that end of the cylinder it enters the channels on the ascending side of the cylinder and is thus discharged. The cylinder is kept constantly supplied with water, which is thrown on the stock both as it enters the chute H and also while it is being carried along the cylinder from a pipe, *o*, which pipe is furnished with a nozzle, N, so directed as to throw a stream directly on the stock as it is entering the cylinder. This pipe extends all along the outside of the cylinder on the ascending side, and is perforated to throw a number of smaller streams of water through the whole length of the wire-work of the cylinder to meet the stock as it is being carried up by the revolution of the cylinder. The pipe *o* should be so supplied as to throw the water upon the stock with great force to wash out the dirt.

While the machine is in operation the supply of water from the nozzle N and perforated jet-pipe *o* is so controlled by cocks, and the escape from the trough so regulated by a sliding gate, P, at the delivery end, that the cylinder is kept flooded only to about the level of the top edge of the lowest curb-piece K. The stock is fed in continuously by hand down the chute H in such quantities as to keep the cylinder about one-third full, or in greater or less quantity, as may be found desirable, and as soon as it enters it is caught by the hooks and carried up to meet the jets of water which enter the ascending side of the cylinder from the pipe *o*, after which, by its continued ascent, it is drained until it reaches the top of the cylinder, where it drops from the hooks into the water at the bottom to be again caught up and submitted again to similar operations, which continue to be repeated until the stock is carried to the end M of the cylinder and discharged therefrom by being carried up between the oblique curb-pieces to such a position that it will slide or roll down the channels between. The washing operation may be repeated as often as necessary, either in the same machine or other machines of the same construction. The cylinder may be rotated at the rate of about fifteen to twenty revolutions per minute; but this may be varied, if desired. Instead of arranging the hooks spirally around the cylinder, they may be arranged in rings; but in that case the cylinder will require to be placed at a slight inclination, in order that the stock may be carried toward the delivery end. The principle object of the spiral arrangement of the hooks is to avoid placing the cylinder in an inclined position, as when thus placed the water cannot be at the same depth at both ends, but must be deepest at the discharge end, where the curbs would require to be too high for proper and efficient escape or the discharge of the stock. The oblique curbs K, it will be observed, are arranged in close succession around the discharge end of the cylinder, and form, as before stated, passages between them for the discharge of the stock. Were it not for these channel-ways the stock would accumulate in too great quantities at the discharge end of the cylinder before being discharged, for whatever might be used to retain the required quantity of water would retain the stock.

I am aware that a wire-gauze or reticulated cylinder has been used in connection with a trough of water for various purposes, and that such a combined cylinder and trough has also been used in connection with agitators and also with elevators for the purpose of agitating or stirring and elevating earthy substances containing gold for the separation thereof. I am also aware that a cylinder has been used with inclined flanges or curbs at or near the end, and therefore I do not wish to be understood as making claim to any of these as of my invention; but What I do claim as my invention for washing paper-stock, is—

1. The employment of a wire-gauze or reticulated cylinder with open ends, and placed with its axis in a horizontal or nearly horizontal position, and with its lower part revolving in a trough of water, substantially as herein described; but this I only claim when the said cylinder is provided on the inside with hooked or bent teeth for the purpose of catching and elevating the paper-stock in separate portions to drain the water out of it and drop it in the water, and thus subject it to the several operations required as it is moved from end to end of the cylinder, as set forth.

2. In combination with a reticulated cylinder armed with hooked teeth and rotated in a trough of water, substantially as described, for the washing of paper-stock, the employment of inclined curbs, substantially as described, at the delivery end of the cylinder for the purpose of regulating the delivery of the paper-stock, as set forth.

HORACE W. PEASLEE.

Witnesses:

H. W. McCLELLAN.

ALFRED NASH.